No. 731,427. PATENTED JUNE 23, 1903.
W. BROTHERTON.
NUT LOCK.
APPLICATION FILED FEB. 18, 1903.
NO MODEL.

Witnesses

William Brotherton, Inventor
By Hensey & Gough
Attorneys

No. 731,427.

Patented June 23, 1903.

UNITED STATES PATENT OFFICE.

WILLIAM BROTHERTON, OF PEEKSKILL, NEW YORK.

NUT-LOCK.

SPECIFICATION forming part of Letters Patent No. 731,427, dated June 23, 1903.

Application filed February 18, 1903. Serial No. 143,949. (No model.)

*To all whom it may concern:*

Be it known that I, WILLIAM BROTHERTON, a citizen of the United States, residing at Peekskill, in the county of Westchester and State of New York, have invented a certain new and useful Improvement in Nut-Locks, of which the following is a specification, reference being had therein to the accompanying drawings.

This invention has relation to nut-locks; and it consists in the novel construction and arrangement of its parts, as hereinafter described.

The object of the invention is to provide a nut of special construction adapted to be used in combination with a bolt having a thread and a recess extending transversely across the threaded end thereof, the nut having a closed end provided on its inner side with a cone or a frustum of a cone, with an annular recess surrounding the same, the said nut when screwed upon the thread of the bolt forcing the apex of the cone or the end of the frustum into the recess in the end of the bolt and spreading the opposite portions of the bolt and deflecting them into the annular recess surrounding the cone or frustum of the cone.

Figure 1:
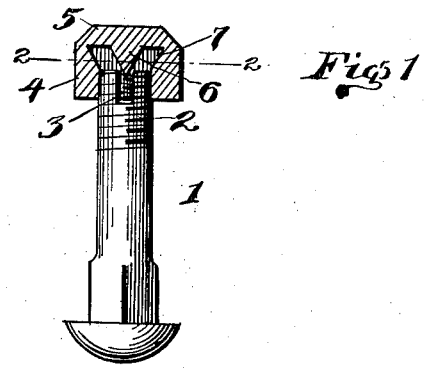
Figure 2:
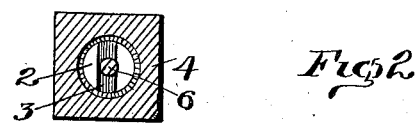
Figure 3:
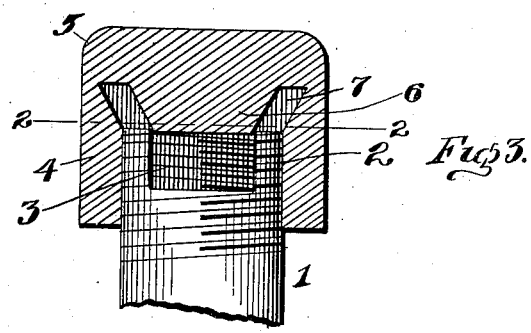
Figure 4:
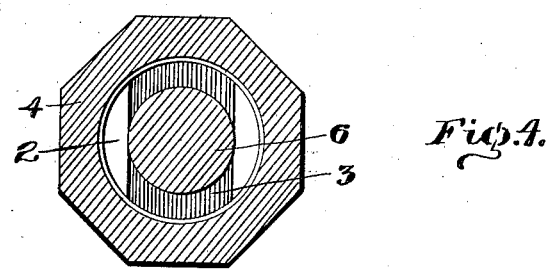

In the accompanying drawings, Figure 1 is a side elevation of the bolt with the nut provided with a cone shown in section. Fig. 2 is a sectional view of the device shown in Fig. 1, cut on line 2 2. Fig. 3 is a side elevation of the bolt, showing the nut in section provided with a frustum of a cone. Fig. 4 is sectional view of the form of the invention as shown in Fig. 3.

The bolt 1 is provided at one end with the usual thread 2, the recess 3 extending transversely across the threaded end of the said bolt. The nut 2 is internally threaded, as is customary. The outer end of the said nut is closed, as at 5, and the cone 6 is located within the nut, the apex of the said cone extending toward the bolt 1. The said cone is surrounded by the annular recess 7.

In the form of the invention as shown in Figs. 3 and 4 the frustum of a cone is substituted for the cone 6, which answers all requirements.

In applying the nut to the bolt the thread of the said nut is screwed upon the thread 2 of the bolt, and the end of the cone 6 or frustum enters the recess 3, and as the nut moves toward the head of the bolt the side of the cone or frustum of a cone spreads the threaded ends of the bolt and forces the distorted parts into the annular recess surrounding the cone or frustum of a cone. Thus the nut is secured in contact with the bolt and can only be removed by the exercise of extraordinary force. The outer wall of the annular recess 7 is parallel with the surface of the cone or frustum, and consequently the said recess is of such shape as to permit the reception therein of the maximum length of the projections on the nut of the bolt constituting the sides of the recess 3.

Having described my invention, what I claim as new, and desire to secure by Letters Patent, is—

1. A nut-lock consisting of a bolt having a recess at the end thereof, a nut adapted to be forced upon said bolt, said nut having an integral conical part, said conical part being surrounded by an annular recess, the outer wall of which is parallel to the side of the conical part, the said conical part being adapted to enter the recess in the bolt and distort the ends thereof into the annular recess.

2. A nut-lock consisting of a bolt having a recess at the end thereof, a nut adapted to be forced upon said bolt, said nut having a conical part, said conical part being surrounded by an annular recess, the outer wall of said recess being parallel with the side of the conical part, said outer wall of said recess and the side of said conical part being smooth, the said conical part adapted to enter the recess in the bolt and to distort the ends thereof into the annular recess.

In testimony whereof I affix my signature in presence of two witnesses.

WILLIAM BROTHERTON.

Witnesses:
 LEVERETT F. CRUMB,
 SANFORD R. KNAPP.